United States Patent [19]

Parker

[11] Patent Number: 5,081,531
[45] Date of Patent: Jan. 14, 1992

[54] METHOD AND APPARATUS FOR PROCESSING A HIGH DEFINITION TELEVISION SIGNAL USING MOTION VECTORS REPRESENTING MORE THAN ONE MOTION VELOCITY RANGE

[75] Inventor: David W. Parker, Redhill, England

[73] Assignee: U.S. Philips Corporation, New York, N.Y.

[21] Appl. No.: 452,850

[22] Filed: Dec. 19, 1989

[30] Foreign Application Priority Data

Jan. 11, 1989 [GB] United Kingdom ............... 8900603
Nov. 17, 1989 [GB] United Kingdom ............... 8926056

[51] Int. Cl.⁵ .......................... H04N 7/01; H04N 7/08
[52] U.S. Cl. ................................ 358/105; 358/140;
  358/142; 358/141
[58] Field of Search ............. 358/141, 140, 105, 133,
  358/12, 142

[56] References Cited

U.S. PATENT DOCUMENTS

| 4,442,454 | 4/1984 | Powell | 358/167 |
| 4,873,573 | 10/1989 | Thomas et al. | 358/105 |
| 4,897,716 | 1/1990 | Drewery et al. | 358/140 X |
| 4,924,308 | 5/1990 | Fenchtwanger | 358/133 |
| 4,931,855 | 6/1990 | Salvaderini | 358/141 X |

OTHER PUBLICATIONS

"Motion Compensated Interpolation Applied to HD-MAC Pictures Encoding and Decoding"; Haghiri et al., Feb. '88–Mar. '88.

*Primary Examiner*—Victor R. Kostak
*Attorney, Agent, or Firm*—Michael E. Marion

[57] ABSTRACT

A high definition television signal from a source such as a television camera (1) is applied to three parallel processing branches the operation of each branch being determined by a range of motion. An 80 ms branch (3, 4, 5) and a 20 ms branch (6, 7, 8) each respectively have a two dimensional low pass filter, a sub-sampler and a line shuffler. A 40 ms branch (9,10) only has a two dimensional filter and a sub-sampler. A motion estimator (14) determines the degree of movement of picture blocks and a decision unit (13) decides on the appropriate branch, the motion vectors for the 20 ms and 40 ms branch and the blocks to which these are applied. This information is applied to a DATV formatting device (15) which produces a menu of motion vectors and codewords for each block. A switch (11) selects the appropriate branch for each block.

18 Claims, 2 Drawing Sheets

METHOD AND APPARATUS FOR PROCESSING A HIGH DEFINITION TELEVISION SIGNAL USING MOTION VECTORS REPRESENTING MORE THAN ONE MOTION VELOCITY RANGE

BACKGROUND OF THE INVENTION

The present invention relates to a method of processing a high definition television signal for conveyance by way of a transmission channel or record carrier, said method comprising the steps of:

i) dividing a television picture into a plurality of adjacent blocks,
ii) determining the degree of movement in each block,
iii) categorizing each block into one of at least three categories with a first of said categories relating to blocks where the picture information is stationary or substantially stationary while other categories relate to blocks where the picture information exhibits various ranges of motion,
iv) processing each block in a manner determined by the category in which it falls,
v) calculating motion vectors for blocks of a second of said categories whose picture information exhibits movement within a first motion range, and
vi) combining motion information in digital data form relating to motion vectors with the processed picture information to form a high definition television signal which digital data is allocated a given data capacity within the transmission capacity of said television signal.

The invention also relates to apparatus for use with the above method.

Such a method is disclosed in the paper "Motion compensated interpolation applied to HD-MAC pictures encoding and decoding" by M. R. Haghiri and F. Fonsalas presented at the 2nd International Workshop on Signal Processing of HDTV, L'Aquilla, Italy, Feb. 29,-Mar. 2, 1988. In the method disclosed in that paper the television picture from a high definition source is subdivided into a plurality of blocks and each block is processed according to the degree of movement in the blocks. Processing is achieved by three parallel branches having different refresh times, one branch being for (substantially) stationary picture information while the other branches are for two different ranges of motion of the picture information. Details of the branches are given as:

1. 80 ms branch with a field rate of 12.5 Hz applied for motion velocities ranging from 0 to 0.5 pixel per 40 ms.
2. 40 ms branch with a field rate of 25 Hz applied for motion velocities ranging from 0.5 to 2 pixels per 40 ms
3. 20 ms branch with a field rate of 50 Hz applied for motion velocities greater than 2 pixels per 40 ms.

The paper further describes that the 40 ms branch can be a motion compensated branch whereby motion vectors are generated according to the motion in blocks processed by that branch and the motion vectors used at the receiver for computing intermediate fields. Simulations on several natural television scenes revealed that with such a motion compensated scheme the motion velocity range for the 40 ms branch could be extended from 0.5 to 2 pixels per 40 ms to 0.5 to 6 pixels per 40 ms.

The above method formed a contribution to the work of a European research project EUREKA 95 on HDTV (high definition television) and this contribution eventually formed part of the HD-MAC coding system selected by that project. The selected coding system is described in the paper "HD-MAC coding for Broadcasting of High Definition Television Signals" by F. W. P. Vreeswijk as a contribution to the Club de Rennes Young Researchers' Seminar (Les Assises des Jeunes Chercheurs) at M. I. T. Cambridge, Mas., U.S.A., Oct. 9th to 13th , 1988. From this paper it will be seen that the motion velocity range for the motion compensated 40 ms branch covers from 0.5 to 12 pixels per 40 ms whilst the 20 ms branch is active for motion velocities greater than 12 pixels per 40 ms. In the selected coding system the transmitted number of samples is the same for each mode. In principle, halving the field rate allows the number of samples per frame to be doubled. The switching of modes is implemented on a block basis, because of the limited amount of DATV (digitally-assisted television) data capacity. After subsampling, the 1250 lines signal from a high definition television source with line time of 32 μs has to be converted to a 625 line signal with 64 μs line time. This conversion is done by interleaving the HD samples of two consecutive intra-field HD lines. This technique is termed "line shuffling". In the HD decoder these samples are separated by a reciprocal "line de-shuffling" operation. Both encoder and decoder have three luminance coding branches, corresponding to the three modes. The three branches have three different spatial characteristics and therefore each branch has its subsampling scheme. The 40 msec. branch contains a motion estimator, which uses a block matching algorithm. The switching decisions come from a combination of both an "a priori" and an "a posteriori" decision scheme. There are only two chrominance coding branches: an 80 msec. branch and a 20 ms coding branch though this has subsequently been changed to add the third (40 ms) branch. No motion compensation is employed for the chrominance signal. The decoder derives the chrominance switching signal from the luminance DATV signal.

A branch switching signal will only have 5 possible temporal routes per basic 80 msec. period. The limitation follows from the observation that in a three branch system it is not useful to start a sub-sampling, using two or four fields, when the sub-sampling mode is changed before the two or four fields are really transmitted as this would cause severe alias to occur in the picture. The five temporal routes are:

|  | field: | | | |
| --- | --- | --- | --- | --- |
|  | 1 | 2 | 3 | 4 |
| Route 1: | 80 | 80 | 80 | 80 |
| Route 2: | 40 | 40 | 40 | 40 |
| Route 3: | 40 | 40 | 20 | 20 |
| Route 4: | 20 | 20 | 40 | 40 |

Before the coding operation a vector assignment is applied to limit the bit rate. In every first frame of an 80 msec. period all 169 possible vectors can be coded. In every second frame however, the best vector out of nine "neighbouring vectors" in the previous frame is selected and hence coded. If no vector is found the corresponding block will be transmitted in the 20 msec. mode. This results in the following possibilities:

|          | fields |         |
|----------|--------|---------|
|          | 1   1  |         |
| Route 1: | 80—80  | 1       |
| Route 2: | 40—40  | 169 × 9 |
| Rotue 3: | 40 - 20| 169     |
| Route 4: | 20 - 40| 8       |
| Route 5: | 20—20  | 1       |
|          |        | 1700    |

In total there are thus 1700 possibilities per 80 msec. each of which can be coded with an 11 bit codeword. There are 6480 blocks per frame for a 1440 pixel by 1152 line active frame where the blocks are 16 pixels by 16 lines. Hence the bitrate is 891 kb/sec which is within the 1M bits per second allocation for this purpose.

With the selected coding system an 11 bit codeword is sent for each block per 80 ms which codeword is converted by means of a PROM at the decoder into a 2 bit block routing signal for the odd frame (BD-OFR), a 2 bit block routing signal for the even frame (BD-OFR), an 8 bit motion vector for the 40 ms blocks in the odd frame (MV-OFR) and a 4 bit motion vector relative address for the 40 ms blocks in the even frame (MV-EFR). The PROM contents are illustrated in the following table:

| DATV Codeword | BD-OFR | BD-EFR | MV-OFR  | MV-EFR |
|---------------|--------|--------|---------|--------|
| 1             | 80     | 80     | —       | —      |
| 2 ... 1522    | 40     | 40     | 1 ... 169 | 1 ... 9 |
| 1523 ... 1691 | 40     | 20     | 1 ... 169 | —      |
| 1692 ... 1699 | 20     | 40     | —       | 1 ... 8 |
| 1700          | 20     | 20     | —       | —      |

It is an object of the invention to provide modifications of the above processing method.

SUMMARY OF THE INVENTION

The present invention provides a method of processing a high definition television signal for conveyance by way of a transmission channel or record carrier, said method comprising the steps of:

i) dividing a television picture into a plurality of adjacent blocks, ii) determining the degree of movement in each block, iii) categorizing each block into one of at least three categories with a first of said categories relating to blocks where the picture information is stationary or substantially stationary while other categories relate to blocks where the picture information exhibits various ranges of motion, iv) processing each block in a manner determined by the category in which it falls, v) calculating motion vectors for blocks of a second of said categories whose picture information exhibits movement within a first motion range, and vi) combining motion information in digital data form relating to motion vectors with the processed picture information to form a high definition television signal which digital data is allocated a given data capacity within the transmission capacity of said television signal, said method being characterised in that vii) motion vectors are additionally calculated for blocks of a third of said categories whose picture information exhibits movement within a second motion range which differs to that of said first motion range, viii) that motion vectors calculated for the said second and third category blocks are dynamically allocated on the basis of picture content and said given data capacity, and ix) that the motion information in digital data form combined with the processed picture information relates to the dynamically allocated motion vectors for said second and third category blocks with the total motion information remaining within the said given data capacity.

The invention has the advantage that motion vectors for more than one range of motion velocities can be signalled which at a receiver can be used to improve the quality of the HDTV signal especially when displayed at a field rate which is higher than that of the transmitted signal.

The method may be further characterised in that the relative motion for blocks of the third category may be greater than that for blocks of the second category.

Where the motion vectors for the blocks of said second category are stored at a receiving end of said channel or carrier the method may be characterized by the additional steps of x) determining which of said stored motion vectors are relevant to the blocks of said second of said categories over a given period, xi) compiling a menu of said relevant motion vectors, and xii) combining said menu in digital data form with the processed picture information.

As an alternative the motion vectors relevant to the blocks of said second category over a given period may be combined in digital data form with the processed picture information. In either case the motion vectors relevant to the blocks of said third category over said given period may be combined in digital data form with the processed picture information.

The said given period may correspond to two frame periods for said television signal.

The total motion information and additionally specified information in digital data form should preferably remain within the said given data capacity.

The invention also provides encoding apparatus for use with the above method. Such apparatus may comprise means for dividing a television picture into a plurality of adjacent blocks, means determining the degree of movement in each block, means for categorizing each block into one of at least three categories block with a first of said categories relating to blocks where the picture information is stationary or substantially stationary whilst other categories relate to blocks where the picture information exhibits various ranges of motion, means for processing each block in a manner determined by the category in which it falls, means for calculating motion vectors for blocks of a second of said categories whose picture information exhibits movement within a first motion range, and means for combining motion information in digital data form relating to motion vectors with the processed picture information to form a high definition television signal which digital data is allocated a given data capacity within the transmission capacity of said television signal, charaterized in that said apparatus further comprises means for additionally calculating motion vectors for blocks of a third of said categories whose picture information exhibits movement within a second motion range which differs to that of said first motion range, means for dynamically allocating motion vectors calculated for the said second and third category blocks on the basis of picture content and said given data capacity, and means for combining the motion information in digital data form with the processed picture information which motion information relates to the dynamically allocated motion vectors for said second and third category blocks with the total motion information remaining within the said given data capacity.

Where a given number of motion vectors for the blocks of said second category are identified in said encoder, said apparatus may be characterized in that it additionally comprises means for determining which of said given number of motion vectors are relevant to the blocks of said second category over a given period, means for compiling a menu of said relevant motion vectors, and means for combining said menu in digital data form with the processed picture information. Alternatively means may be provided for combining the motion vectors relevant to the blocks of said second category over a given period in digital data form with the processed picture information. In either case further means may be provided for combining the motion vectors relevant to the blocks of said third category over a given period in digital data form with the processed picture information.

The invention further provides decoding apparatus for use with the above method. Such apparatus may be characterized in that it comprises means for receiving said television signal, means for separating said digital data and said picture information from said television signal, means for processing said picture information in accordance with the three categories of relative motion, means for selecting picture information processed in accordance with its appropriate category under the control of said motion information, means for subjecting said picture information to interpolation under the control of motion vectors when the relative motion of said picture information lies within said second category, and means for subjecting said processed picture information to interpolation under the control of motion vectors when the relative motion of said picture information lies within said third category.

Where the motion vectors for the blocks of said second category are stored in a store, such apparatus may be further characterized in that it additionally comprises means for receiving with said motion information a menu of those stored motion vectors which are relevant to the blocks of said second category, and means for making available during said given period those of said stored motion vectors selected by said menu under the control of said motion information. As an alternative such apparatus may additionally comprises means for receiving with said motion information the motion vectors relevant to the blocks of said second category over a given period. In either case the apparatus may further comprise means for receiving with said motion information the motion vectors relevant to the blocks of said third category over said given period.

BRIEF DESCRIPTION OF THE DRAWINGS

The invention will now be described, by way of example, with reference to the accompanying drawings, in which.

DETAILED DESCRIPTION OF PREFERRED EMBODIMENTS OF THE INVENTION

The bandwidth compression algorithm used for HD-MAC uses motion compensation to reconstruct alternate fields for 40 msec blocks. Motion vector information is only supplied for these 40 msec blocks. The display format used for HD-MAC is not part of the signal specification and can be chosen as a manufacturer's option. Eventually it will be necessary to use a display field rate higher than the 50 Hz transmission rate to reduce the large area flicker on large bright displays. Advanced algorithms for doing this field rate upconversion will require motion compensation for the upconversion of the 20 msec blocks as well as the 40 msec blocks. As motion estimation in the receiver is considered impracticable in the foreseeable future it is proposed that the necessary motion information for the 20 ms blocks as well as those for the 40 ms blocks be carried in the DATV signal.

Although motion compensated display conversion may not be used in the first generation of HD-MAC receivers, it is essential that provision for signalling the motion information be included in the specification of the DATV part of the HD-MAC signal from the beginning. The following considers how additional motion information for use in display upconversion can be included in the DATV signal while staying within the capacity limits of the HD-MAC DATV channel.

The presently proposed basic DATV scheme for the HD-MAC system contains some spare capacity as of the 2048 11 bit codewords the codewords 1701-2047 are not used. In addition it is considered that for many scenes the total number of 40 ms motion vectors, N, available for use per 80 msecs period can be reduced below 169 without causing appreciable picture degradation. The N most "dominant" motion vectors can be selected by the encoder and sent as a "menu" as part of the DATV. This could enable the number of bits needed per block and hence the DATV rate to be reduced as indicated below:

| N | bits/block | DATV rate kbits/sec* |
|---|---|---|
| 101 | 10 | 810 |
| 50 | 9 | 729 |
| 24 | 8 | 648 |

*plus the data required to send the menu.

The vector values in the menu could be signalled in one of two ways:
1) Explicitly sending a list of the N vector values. As an example, let us allow 8 bits/vector to cover the range ±8 pixels (lines)/20 msec. Then to send a 50 vector menu every 80 msecs would need a DATV capacity of $(50 \times 8)/80..10^{-3} = 5$ kbits/sec.
2) If the vectors are limited to being a selection out of the "original" set of 169, then only 169 bits need to be sent to indicate which ones have been selected. The DATV rate needed for a menu of any size is then given by $169/80.10^{-3} = 2.1$ kbits/sec.

One way to increase the number of motion vectors available for a scene is to consider the picture to be split into sub-areas and to have a different menu for each sub-area. For a modest number of sub-areas e.g. 4, the DATV rate is only slightly increased by having to send a number of menus per 80 msecs.

In proposing a method by which motion vectors for 20 msec blocks can be provided the following assumptions will be made:
1) The basic scheme of combining route and vector information over an 80 msec period stays the same.
2) No more than 11 bits/block can be used.
3) The same vector selection method will be used for 40 msec block motion vectors for the first and second frames as before.
4) Vectors for 20 msec blocks will be signalled, valid for blocks in the even fields i.e. the same fields to which the 40 msec vectors apply.
5) One of the 20 msec "vectors" will always have to be used to indicate that no vector assignment is possible.

If independent 20 msec vectors are used for each frame then if there are N 40 msec vectors and V 20 msec vectors, the number of possibilities are:

|  | fields: | |
|---|---|---|
|  | 1 | 3 |
| Route 1: | 80—80 | 1 |
| Route 2: | 40—40 | N.9 |
| Route 3: | 40 - 20 | N.V |
| Route 4: | 20 - 40 | V.8 |
| Route 5: | 20—20 | V.V |
|  |  | $V^2+8V+NV+9N+1$ |

If again an 11 bit codeword is used, then the maximum value of $(V^2+8V+NV+9N+1)$ is 2047; some possible combinations of N and V are:

| N | 203 | 169 | 113 | 100 | 50 | 20 | 0 |
| V | 1 | 2 | 7 | 9 | 20 | 31 | 41 |
| $V^2+8V+NV+9N+1$ | 2040 | 1880 | 1914 | 1954 | 2011 | 2010 | 2010 |

Instead of having a fixed number of vectors only applicable to the 40 msec blocks, the number of vectors available for both 40 msec and 20 msec blocks in any 80 msecs period should be variable. This means that the values of N and V, together with the vector "menus" have to be sent as part of the DATV information. If all receivers understood this format, then an HD-MAC service could start using the existing vector range with vectors only for 40 msec blocks, while at a later stage 20 msec block vectors could be added to the signal for use in display upconversion. Earlier receivers could then just ignore this additional information.

As the vector "mix" (40 msec v 20 msec) changes from one 80 msec period to another, an advanced encoder could dynamically choose the optimum number and type of vectors to suit the picture material provided it stays within the specified data capacity of the system. Another possibility is that changes to the vector mix are only made occasionally when, for instance, a new generation of encoder is brought into service.

Only considering the "TV mode" and ignoring the "film mode" the DATV information per 80 msecs period would consist of:
(i) Number of 40 msec vectors, N (8 bits)
(ii) Number of 20 msec vectors, V (6 bits)
(iii) Number of sub-ares in a frame, M (4 bits)
(iv) [Table of N 40 msec vectors]*
(v) [Table of (V-1) 20 msec vectors]*

(* These would be repeated M times for the case where the picture is divided into sub-areas each with its own vector menu.)
(vi) 6480 11 bit words.

Only (V-1) 20 msec vector values are sent because one of the possibilities for the 20 msec blocks must always be that no vector assignment is possible. A "fallback" method would then have to be used for display upconversion of those blocks.

Some examples of the data rates required for different values of N and V using 11 bits/block are given below for a frame divided into four sub-areas:

| 1. 169 40 msec vectors only N = 169, V = 1 |
|---|
| Number of bits per 80 msecs: |

| (i) | 8 |
| (ii) | 6 |
| (iii) | 4 |
| (iv) | 169 × 4 = 676[1] |
| (vi) | 6480 × 11 = 71280 |
|  | 71974 bits/80 msecs |
|  | DATV rate = 899.7 kbits/sec. |

| 2. 50 40 msec vectors and 20 20 msec vectors. N = 50, V = 20. |
|---|
| Number of bits per 80 msecs: |

| (i) | 8 |
| (ii) | 6 |
| (iii) | 4 |
| (iv) | 169 × 4 = 676[1] |
| (v) | 20 × 10 × 4 = 800[2] |
| (vi) | 6480 × 11 = 71280 |
|  | 72774 bits/80 msecs |
|  | DATV rate = 909.7 kbits/sec. |

| 3. 41 20 msec vectors only. N = 0, V = 41. |
|---|
| Number of bits per 80 msecs: |

| (i) | 8 |
| (ii) | 6 |
| (iii) | 4 |
| (v) | 40 × 10 × 4 = 1600[2] |
| (vi) | 6480 × 11 = 71280 |
|  | 72898 bits/80 msecs |
|  | DATV rate = 911.2 kbits/sec. |

[1] Assuming that the 40 msec vectors are chosen out of the "original" 169 vectors such that only 169 bits are required to indicate which ones are used.
[2] Assuming that 10 bits/vector are used, giving a vector range of ±16 pixels/20 msec to integer accuracy.

Different numbers of vectors have only a small effect on the overall DATV rate which is mainly determined by the number of bits/block used. In order to achieve further flexibility the number of bits/block, B, could also be made variable and signalled to the decoder. If a lower number of vectors is needed for a scene, the DATV rate could be reduced and the "spare" data capacity could then be used for other purposes. Probably only the additional cases of 9 or 10 bits/block are realistic possibilities. Possibilities are then:

i) 10 bits/block. The maximum value of $(V^2+8V+NV+9N+1)$ is 1023; some possible combinations of N and V are:

| N | 101 | 44 | 0 |
| V | 1 | 10 | 28 |
| $V^2+8V+NV+9N+1$ | 1020 | 1017 | 1009 | ii) 9 bits/block. The maximum value of $(V^2+8V+NV+9N+1)$ is 511; some possible combinations of N and V are:

| N | 50 | 17 | 0 |
|---|---|---|---|
| V | 1 | 10 | 18 |
| $V^2+8V+NV+9N+1$ | 501 | 504 | 469 |

The DATV information per 80 msecs period would now consist of:
(i) Number of 40 msec vectors, N (8 bits)
(ii) Number of 20 msec vectors, V (6 bits)
(iii) Number of sub-areas in a frame, M(4 bits)
(iv) [Table of N 40 msec vectors]*
(v) [Table of V-1 20 msec. vectors]*
(* Again, these woulkd be repeated M times for the case where the picture is divided into sub-areas each with its own vector menus.)
(vi) Number of bits/block, B (4 bits)
(vii) 6480 words of B bits.
Some examples of the data rates required for different values of N, V and B are given below again for where a frame is divided into four sub-areas:

1. 50 40 msec vectors and 1 20 msec vector. $N = 50, V = 1$.
Number of bits per 80 msecs:

| | | |
|---|---|---|
| (i) | | 8 |
| (ii) | | 6 |
| (iii) | | 4 |
| (iv) | $169 \times 4 =$ | $676^{(1)}$ |
| (vi) | | 4 |
| (vii) | $6480 \times 9 =$ | 58330 |
| | | 59018 bits/80 msecs |
| | DATV rate = | 737.7 kbits/sec. |

2. 44 40 msec vectors and 10 20 msec vectors. $N = 44, V = 10$.
Number of bits per 80 msecs:

| | | |
|---|---|---|
| (i) | | 8 |
| (ii) | | 6 |
| (iii) | | 4 |
| (iv) | $169 \times 4 =$ | $676^{(1)}$ |
| (v) | $10 \times 10 \times 4 =$ | $400^{(2)}$ |
| (vi) | | 4 |
| (vii) | $6480 \times 10 =$ | 64800 |
| | | 65898 bits/80 msecs |
| | DATV rate = | 823.7 kbits/sec. |

(1) Assuming that the 40 msec vectors are chosen out of the "original" 169 vectors such that only 169 bits are required to indicate which ones are used.
(2) Assuming that 10 bits/vector are used, giving a vector range of ±16 pixels/20 msec to integer accuracy.

An implication for a receiver is that the DATV decoder now needs RAM storage for the vector "menus". Also, the contents of the lookup table used to decode the DATV are not fixed i.e. it is implemented in RAM rather than PROM. The look up table in the decoder is now as shown in the following table.

| DATV Codeword | BD-OFR | BD-EFR | MV-OFR | MV-EFR |
|---|---|---|---|---|
| 1 | 80 | 80 | — | — |
| 2 ... 9N+1 | 40 | 40 | 1 ... N | 1 ... 9 |
| 9N+2 ... 9N+NV+1 | 40 | 20 | 1 ... N | 1 ... V |
| 9N+NV+2 ... 9N+NV+8V+1 | 20 | 40 | 1 ... V | 1 ... 8 |
| 9N+NV+8V+2 ... 9N+NV+8V+$V^2$+1 | 20 | 20 | 1 ... V | 1 ... V |

Again 2 bits are needed for BD-OFR and BD-EFR, 8 bits are needed for MV-OFR and 6 bits for MV-EFR which are now either pointers to locations in the vector menu RAMs or relative addresses for the blocks in the second frame as before. The routing information defines whether the information refers to 40 msec or 20 msec blocks.

The maximum size of the look up table is $2048 \times 18$ bits = 36.9 kbits. In the case where N and V are changed dynamically to suit the picture content this is too much data to transmit every 80 msecs as the required data rate would be 461 kbits/sec. However, only the values of N and V need be sent and the look up table can be calculated in the decoder. As the DATV is sent 80 msec in advance of the video, there is approximately 80 msecs available for this computation. This means that there is approximately 39 usecs available to compute each 18 bit word and to load it into RAM. This will be possible with a microprocessor in the DATV decoder.

The above proposal for a flexible DATV structure for HD-MAC would allow a service to start using the present 169 possible vectors applying only to the 40 msec blocks. Later it would be possible to add vectors for the 20 msec blocks for use in display upconversion. If all receivers were able to interpret the flexible structure, the first generation of receivers could continue to operate by ignoring the new 20 msec vector information.

Figure 1:
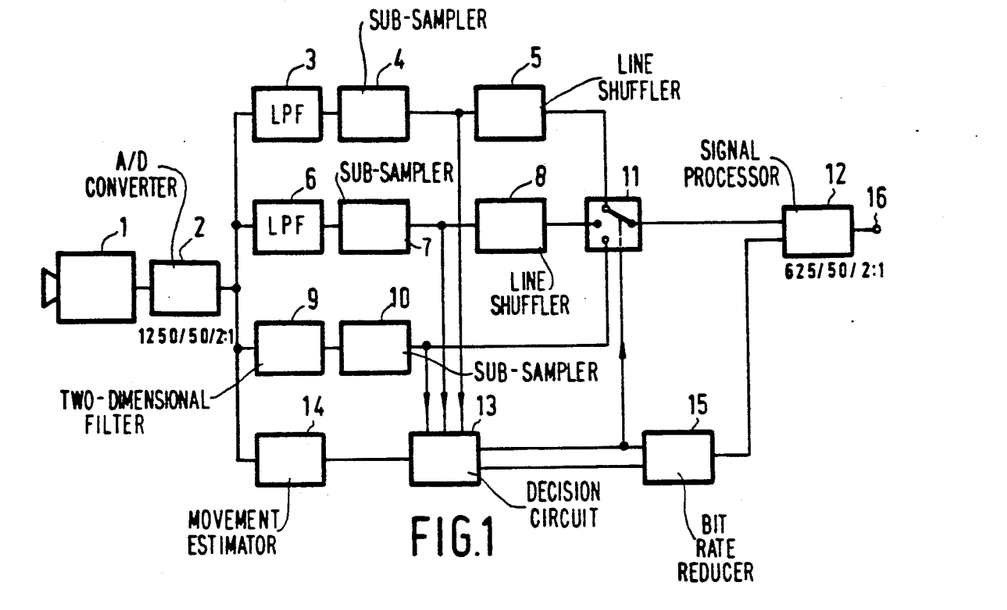
FIG. 1 is a block diagram of an HDTV generator for use with the invention.

FIG. 1 is a block diagram of high definition television generator for use with the invention including an encoder for processing a high definition television signal to produce picture information and in addition motion information as appropriate. A high definition television camera 1 produces a television signal having 1250 lines per picture (frame) period at a field rate of 50 Hz with each frame being formed of two interlaced fields (1250/50/2:1). Although the camera will produce a colour signal only the luminance component of that signal will be considered further which is applied to an analogue-to-digital converter 2 whose digital output is applied to three parallel processing branches which form the 20 ms, 40 ms and 80 ms branches for processing the signal according to its relative motion. The 80 ms branch comprises a two-dimensional low pass filter 3, a sub-sampler 4 and a line shuffler 5. The 20 ms branch similarly comprises a two-dimensional low-pass filter 6, a sub-sampler 7 and a line shuffler 8 while the 40 ms branch only comprises a two-dimensional filter 9 and a sub-sampler 10. The characteristics of the units in the three branches are not described in detail but are appropriate to the processing required in each branch. It will be seen that a line shuffler is not included in the 40 ms branch as its function is achieved by sub-sampler 10. The picture information outputs of the three parallel processing branches are applied as inputs to a switch 11 whose output is a processed signal from one of the selected branches. This output, still in digital form, is applied as a first input of a signal processor 12 for subsequent further processing in accordance with the television system to be employed e.g. one of the members of the MAC-Packet family and in which the picture information can be converted to analogue form prior to transmission.

Control of the switch 11 to choose the appropriate branch is from a decision circuit 13 which receives inputs from the sub-samplers 4, 7 and 10 from the respective branches and in addition from a movement estimator 14 which in turn receives its input from the digital output of the analogue-to-digital converter 2. The movement estimator 14 uses a block matching algorithm. It measures the Displaced Frame Difference of the actual sample and a sample in the previous frame. The search area per sample is 13 lines by 13 samples. This results in a movement of +/−6 samples per 20 msec or +/−12 samples per 40 msec. In order to limit the amount of search operations (and therefore to limit the hardware complexity of a real-time motion estimator) a three step search method is used, as illustrated in the above mentioned paper by F. W. P. Vreeswijk, resulting in one motion vector per block of 16 by 16 on an HD-grid. A fourth operation is added to this process, which is a spatial check with the neighbouring eight vectors. A cost function of each of the neighbouring vectors is calculated for the actual block. The vector with the minimum cost value is then taken as the final one for that block. This fourth step increases the uniformity of the vector field. So far as motion vectors for 20 ms blocks, these can be generated by phase correlation or similar techniques such as described in our European patent applications 89202207.0 (U.S. Ser. No. 388,422, filed Aug. 2, 1989), 89202208.8 (U.S. Ser. No. 388,421, filed Aug. 2, 1989) or 89202210.4 (U.S. Ser. No. 397,055, filed Aug. 22, 1989). On the basis of such estimations and the other inputs to the decision circuit 13 this circuit decides which of the branches is to be selected for a particular block and in the case of the selection of the 20 ms or 40 ms branches the motion vectors assigned to each such block which are dynamically allocated for each 80 ms period depending on the picture content during that period and the data capacity of the transmission system, about 1 Mbit/s being allowed for the DATV (digitally assisted television) information. The decision as to the selected branch is applied to the control input of switch 11 and additionally to a first input of a DATV formatting device and bit rate reducer 15. A second input of the DATV device 15 receives the motion vectors from the decision circuit 13. This DATV device produces a selection of the motion vectors for the 20 ms and 40 ms branch blocks for each 80 ms period or in the case of 40 ms branch block a menu where the receiver stores all possible (169) 40 ms motion vectors and a sequence of 6480 11 bit codewords (or such lesser number as may be required in a variable scheme) being one for each 16 pixel by 16 line block in a frame having 1440 pixels by 1152 lines. Each code word indicates:

i) a routing signal for the odd frame of each 80 ms period,
ii) a routing signal for the even frame of each 80 ms period.
iii) a motion vector when the block in the odd frame is 20 ms or 40 ms,
iv) either a motion vector relative address when the block in the even frame is 40 ms, or a motion vector when the block in the even frame is 20 ms.

The above digitally coded motion information is applied to a second input of the processor 12 for insertion in the television signal, suitably in lines in the vertical blanking periods. The output from the processor 12 is applied to an output terminal 16 for application to a transmitter.

Although motion estimation and motion generation have been described in one simple manner, other ways are possible. For instance the arrangement could be a modification of that present in FIG. 3 of the above mentioned paper by F. W. P. Vreeswijk.

Figure 2:
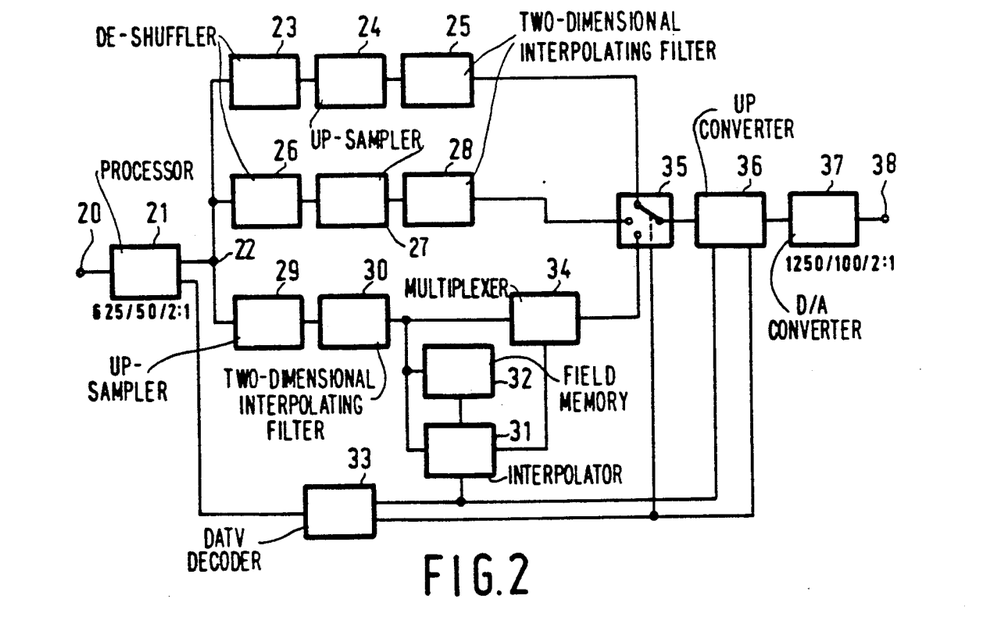
FIG. 2 is a block diagram of an HDTV decoder for use with the invention.

FIG. 2 is a block diagram of receiving apparatus and in particular a decoding portion for the above described method. If it is assumed that the signal transmission uses the MAC-Packet system and may be by way of a satellite transmitting in the 12 GHz band the receiver will receive a down converted signal from an aerial and low noise block down converter. The receiver will then further down convert this signal to a suitable i.f. whereafter the i.f. signal will be demodulated and in FIG. 2 will be present at a terminal 20 for application to a processor 21 in which the picture information is converted from analogue to digital form and processed in accordance with the MAC standard. The resulting luminance components are applied from a first output of processor 21 in 625/50/2:1 form via a junction 22 to three parallel branches for 20 ms, 40 ms and 80 ms processing. The 80 ms branch comprises a de-shuffler 23 to restore the samples to their original positions, an upsampler 24 and a two-dimensional interpolating filter 25. In a similar manner the 20 ms branch comprises a de-shuffler 26, an upsampler 27 and a two-dimensional interpolation filter 28 while the 40 ms branch only has an upsampler 29 and a two-dimensional interpolation filter 30, a de-shuffler not being required. The signals present at the outputs of the filters 25, 28 and 30 are in the form 1250/50/2:1 form although in the case of the second field in each frame for blocks in the 40 ms branch the samples require interpolation. To provide temporal interpolation a motion compensated interpolater 31 receives the first and third fields of each 80 ms period, the third field being received direct from the filter 30 while the first field is delayed by a field memory 32. The interpolator 31 also receives the 40 ms motion vectors from a DATV decoder 33 which decodes the DATV motion information from a DATV signal output of the processor 21. As a result the interpolator 31 produces interpolated second and fourth fields for each 80 ms period which are multiplexed with the first and third fields by a multiplexer 34.

The outputs from the three branches are applied to respective inputs of a switch 35 which selects blocks as appropriate from the three branches under the control of the block selection signal produced in the DATV decoder 33 from the DATV information present in the DATV signal. The output from switch 35 is applied to a motion compensated upconverter 36 to produce, under the control of the block selection signal and motion vectors for the 20 ms and 40 ms branches from the DATV decoder 33, a luminance signal of 1250/100/2:1 form. As this signal is still in digital form it is applied to a digital-to-analogue converter 37 to provide an analogue luminance signal at an output terminal 38 for high definition display purposes.

Figure 3:
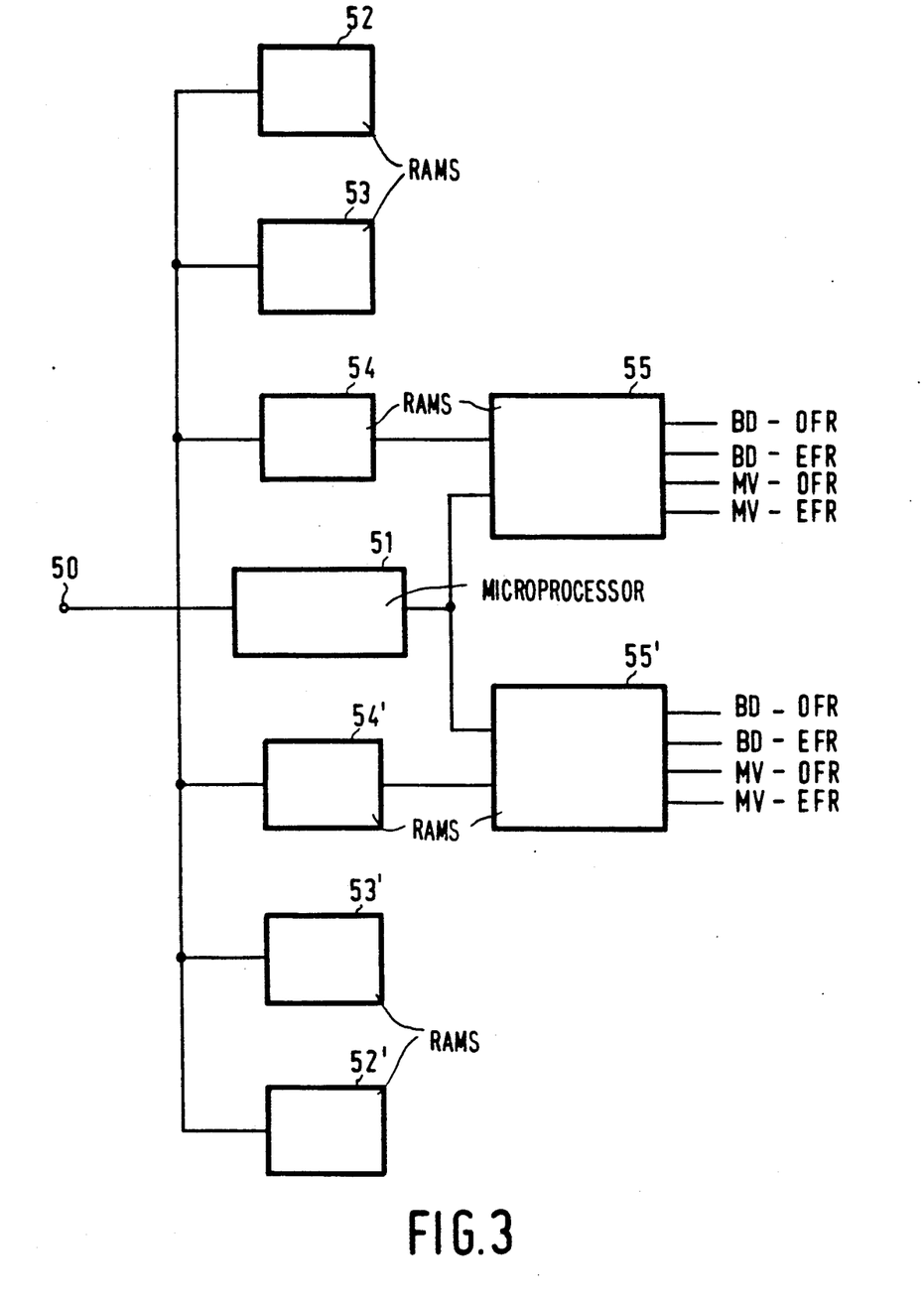
FIG. 3 is a block diagram of part of FIG. 2 in greater detail.

FIG. 3 is a block diagram of the DATV decoder 33 of FIG. 2. The DATV information form the processor 21 in FIG. 2 is applied to an input 50. During a first 80 ms period a microprocessor 51 reads from the DATV information the values of N, V, as well as M and B where applicable. The 40 ms motion vector menu is stored in a first RAM (random access memory) 52 whilst the 20 ms motion vector menu is stored in a second RAM 53 and the 6480 DATV codewords are stored in a third RAM 54. As soon as microprocessor 51 has the values of N and V it starts to compute the values to be put into a decode RAM 55. This must be completed by the end of the 80 ms period. During the next 80 ms period the incoming DATV information is similarly stored in three further RAM'S 52', 53' and 54' and during that period the microprocessor 51 computes the values to be put into store in a further decode RAM 55'.

During this period the contents of RAM 54 are read-out and decoded by decode RAM 55 to provide the information as shown which is required to construct the video information that is arriving during this period. In a similar manner for the subsequent 80 ms period the decode RAM 55' functions in the same way. The following is a flow chart for the operation of the microprocessor 51:

Notes:
1. INT(f) is integer part of f.
2. I is just a variable used for counting.
3. LOAD[I] [X] means load X into location I of decode RAM.
4. The values of MV-OFR and MV-EFR are vector addresses, either referring to the vector menu RAM's or referring to the '1 out of 9' choice' in the previous frame.

As an alternative the 40 ms motion vectors may be selected from a group of vectors stored in the receiver and selected therefrom for each 80 ms period under the control of a received menu.

In the above description the processing is only described in relation to the luminance components. So far as the chrominance components are concerned it is only intended, in the system as described in the above mentioned paper by F. W. P. Vreeswijk to use two branches, namely an 80 ms branch and a 20 ms branch although all three branches could be used. Reference can also be made to that paper for those requiring other information with regard to parts of FIGS. 1 and 2.

From reading the present disclosure, other modifications will be apparent to persons skilled in the art. Such modifications may involve other features which are already known in the design, manufacture and use of methods and apparatus and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method of processing a high definition television signal for conveyance by way of a transmission channel or record carrier, said method comprising the steps of:
   i) dividing a television picture into a plurality of adjacent blocks, ii) determining the degree of movement in each block, iii) categorizing each block into one of at least three categories comprising a first category relating to blocks where the picture information is substantially stationary and a second category relating to blocks where the picture information exhibits a first range of motion, iv) processing each block in a manner determined by the category in which it falls, v) calculating motion vectors for blocks of said second category, and vi) combining motion information in digital data form relating to motion vectors with the processed picture information to form a high definition television signal which digital data is allocated a given data capacity within the transmission capacity of said television signal, said method being characterized in that vii) motion vectors are additionally calculated for blocks of a third category whose picture information exhibits movement within a second motion range which differs from that of said first motion range, viii) motion vectors calculated for the said second and third category blocks are dynamically allocated on the basis of picture content and said given data capacity, and ix) the motion information in digital data form combined with the processed picture information relates to the dynamically allocated motion vectors for said second and third category blocks with the total motion information remaining within the said given data capacity.

2. A method as claimed in claim 1, wherein the relative motion for blocks of the third category is greater than for blocks of the second category.

3. A method as claimed in claim 1 or 2, in which the motion vector for the blocks of said second category are stored at a receiving end of said channel or carrier, wherein said method comprises the additional steps of x) determining which of said stored motion vectors are relevant to the blocks of said second of said categories over a given period, xi) compiling a menu of said relevant motion vectors, and xii) combining said menu in digital data form with the processed picture information.

4. A method as claimed in claim 1 or 2, wherein the motion vectors relevant to the blocks of said second category over a given period are combined in digital data form with the processed picture information.

5. A method as claimed in claim 3 wherein the motion vectors relevant to the blocks of said third category over said given period are combined in digital data with the processed picture information.

6. A method as claimed in claim 3, wherein said given period corresponds to two frame periods for said television signal.

7. A method as claimed in claim 3, wherein the total motion information and additionally specified information in digital data form remains within the said given data capacity.

8. Decoding apparatus for a high definition television signal having motion information in digital data form and picture information produced by the method as claimed in claim 1, wherein said apparatus comprises means for receiving said television signal, means for separating said digital data and said picture information from said television signal, means for processing said picture information in accordance with the three categories of relative motion, means for selecting picture information processed in accordance with its appropriate category under the control of said motion information, means for subjecting said picture information said picture information to interpolation under the control of motion vectors when the relative motion of said picture information lies within said second category, and means for subjecting said processed picture information to interpolation under the control of motion vectors when the relative motion of said picture information lies within said third category.

9. Decoding apparatus as claimed in claim 8, in which motion vectors for the blocks of said second category are stored in a store, wherein said apparatus additionally comprises means for receiving with said motion information a menu of those stored motion vectors which are relevant to the blocks of said second category, and means for making available during said given period those of said stored motion vectors selected by said menu under the control of said motion information.

10. Decoding apparatus as claimed in claim 8, wherein said apparatus additionally comprises means for receiving with said motion information the motion vectors relevant to the blocks of said second category over a given period.

11. Decoding apparatus as claimed in claim 9, wherein said apparatus further comprises means for receiving with said motion information the motion vectors relevant to the blocks of said third category over said given period.

12. Decoding apparatus as claimed in claim 9, in which said given period corresponds to two frame periods for said television signal, wherein said apparatus also comprises means for applying said motion vectors during two frame periods following the two frame periods in which they or a menu are/is received.

13. Encoding apparatus for processing a high definition television signal, said apparatus comprising means for dividing a television picture into a plurality adjacent blocks, means for determining the degree of movement in each block, means for categorizing each block into one of at least three categories with a first of said categories relating to blocks where the picture information is stationary or substantially stationary while other categories relate to blocks where the picture information exhibits various ranges of motion, means for processing each block in a manner determined by the category in which it falls, means for calculating motion vectors for blocks of a second of said categories whose picture information exhibits movement within a first motion range, and means for combining motion information in digital data form relating to motion vectors with the processed picture information to form a high definition television signal which digital data is allocated a given data capacity within the transmission capacity of said television signal, wherein said apparatus further comprises means for additionally calculating motion vectors for blocks of a third of said categories whose picture information exhibits movement within a second motion range which differs to that of said first motion range, means for dynamically allocating motion vectors calculated for the said second and third category blocks on the basis of picture content and said given data capacity, and means for combining the motion information in digital data form with the processed picture information which motion information relates to the dynamically allocated motion vectors for said second and third category blocks with the total motion information remaining within the said given data capacity.

14. Encoding apparatus as claimed in claim 13 in which a given number of motion vectors for the blocks of said second category are identified in said encoder, wherein said apparatus additionally comprises means for determining which of said given number of motion vectors are relevant to the blocks of said second category over a given period, means for compiling a menu of said relevant motion vectors, and means for combining said menu in digital data form with the processed picture information.

15. Encoding apparatus as claimed in claim 13, wherein means are provided for combining the motion vectors relevant to the blocks of said second category over a given period in digital data form with the processed picture information.

16. Encoding apparatus as claimed in claim 14 or 15, characterised in that means are provided for combining the motion vectors relevant to the blocks of said third category over a given period in digital data form with the processed picture information.

17. Encoding apparatus as claimed in claim 14, wherein, said given period correspond to two frame period for said television signal.

18. Encoding apparatus as claimed in claim 14, wherein, the total motion information and additionally specified information in digital data form remains within the said given data capacity.

* * * * *